Dec. 15, 1936.  W. C. HEDGCOCK  2,064,471
TRUCK
Filed Nov. 11, 1932  4 Sheets-Sheet 3
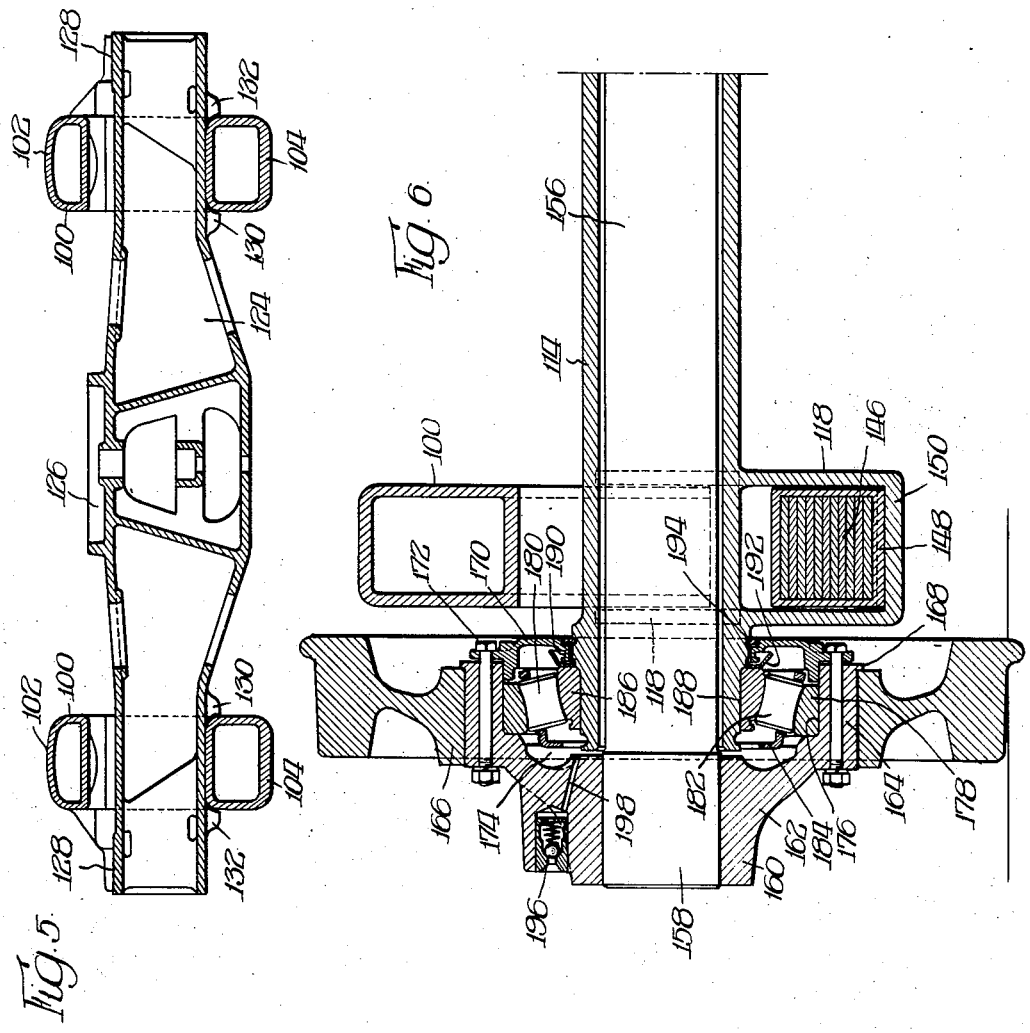
Inventor:
William C. Hedgcock,
By Wilkinson, Huxley, Byron & Knight Attys.

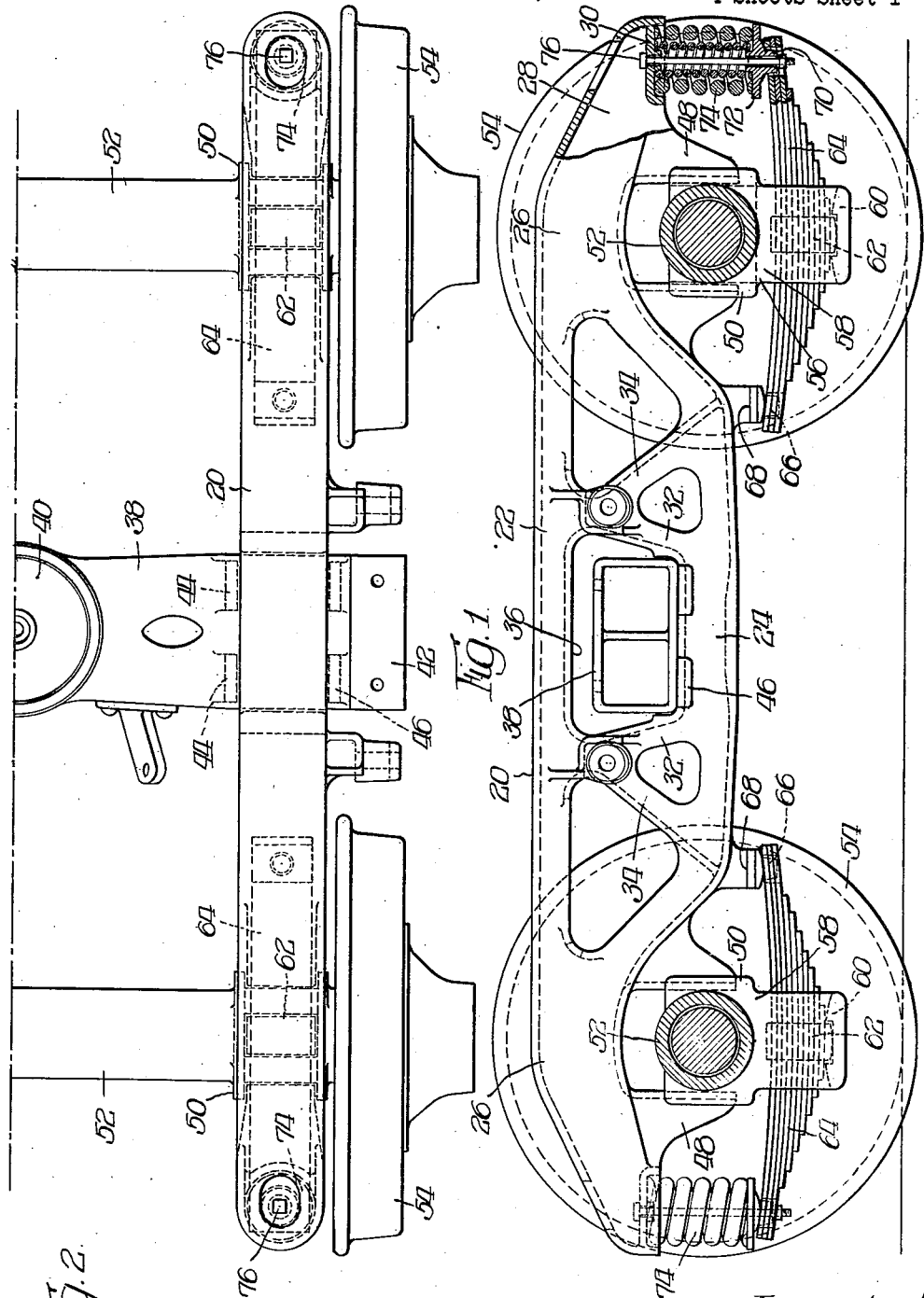

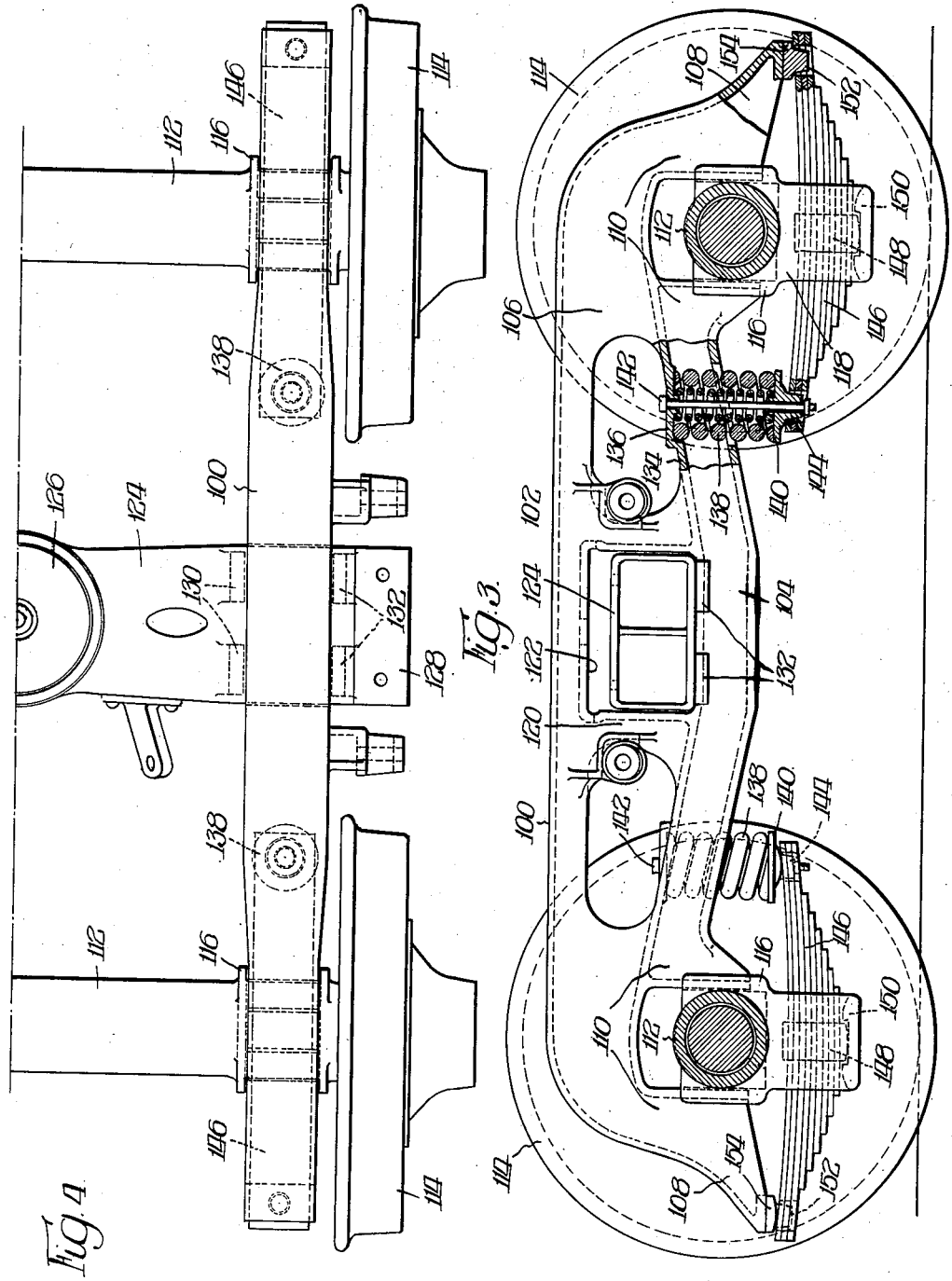

Dec. 15, 1936.  W. C. HEDGCOCK  2,064,471
TRUCK
Filed Nov. 11, 1932  4 Sheets-Sheet 4
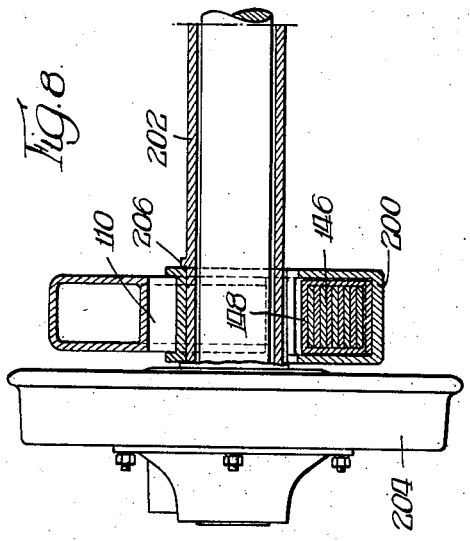
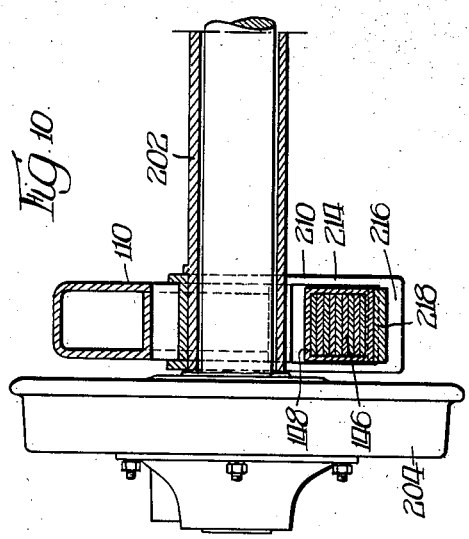
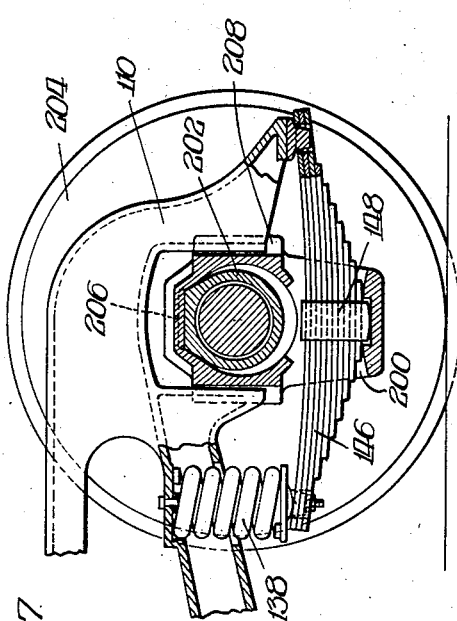
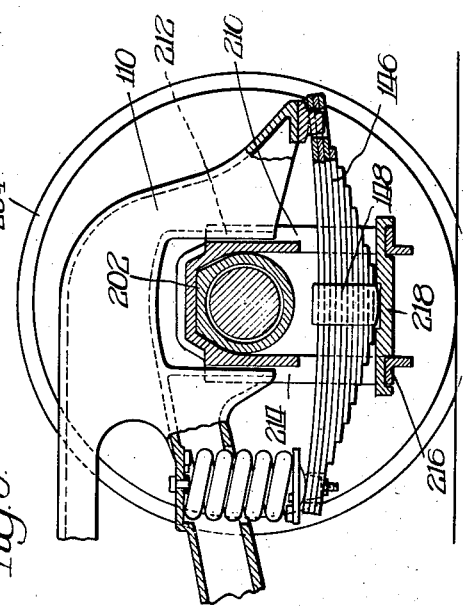
Inventor:
William C. Hedgcock
By Wilkinson, Huxley, Byron & Knight
Attys.

Patented Dec. 15, 1936

2,064,471

UNITED STATES PATENT OFFICE 2,064,471

TRUCK

William C. Hedgcock, Wilmette, Ill., assignor to American Steel Foundries, Chicago, Ill., a corporation of New Jersey Application November 11, 1932, Serial No. 642,145

48 Claims. (Cl. 105—202)

This invention pertains to car trucks.

Desirable features for freight car trucks are economy, simplicity, lightness, strength and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car. The resulting motion imparted to trucks parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes too stiff and lacks sensitivity.

Passenger car trucks are generally easy riding, due to the use of both coil and elliptic leaf springs in series; the coil springs responding to the light, quick shocks, the leaf springs to the slow, heavy impulses. Coil springs are quick and sensitive in response, leaf springs relatively less so, partly due to frictional work absorption between the leaves. For this reason, and also by providing coil and leaf springs of different natural vibration periods, they tend to dampen each other's synchronous vibration without impairing free spring response. This condition is obtained by having the different springs in series. Placing leaf and coil springs in parallel is not sufficient, since they then act as a unit and have a common period of vibration.

Although the usual passenger car truck with series arrangement of coil and leaf springs gives good riding qualities, it is undesirably heavy, costly and complicated for freight service. This is partly due to the complete duplication of carrying capacity in both coil and leaf springs.

It is therefore an object of this invention to provide a car truck which provides good riding qualities, and at the same time is economical to make and maintain, is simple and light in construction, and fulfills all requirements of manufacture and service.

Another object of the invention is to provide a car truck wherein the spring suspension is such that springs of different character are placed in series.

Yet another object of the invention is to provide a car truck having springs of different characteristics in series and so disposed that complete duplication of carrying capacity is not required in both kinds of springs.

A further object of the invention is to provide a car truck having springs of different character which are adapted to work independently of each other whereby shocks incident to operation are adequately absorbed.

A still further object of the invention is to provide a car truck wherein the springs are arranged so that each dampens out the other's vibration.

A different object is to provide spring assemblies wherein there is provided softer cushioning action under light loads, while at the same time providing the necessary stiffness and capacity under heavy loads, these features being combined also to provide a construction which reduces any tendency toward synchronous vibration of the springs.

A still different object is to provide an inboard truck having the advantages of construction, maintenance and riding qualities enumerated above.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a side elevation partly in section of an inboard type of truck construction embodying the invention;

Figure 2 is a fragmentary top plan view of the truck construction shown in Figure 1;

Figure 3 is a side elevation partly in section of a modified form of truck construction embodying the invention;

Figure 4 is a fragmentary top plan view of the truck construction illustrated in Figure 3;

Figure 5 is a transverse fragmentary sectional elevation of the truck construction illustrated in Figures 3 and 4, the same being taken substantially in the plane of the transverse center line thereof;

Figure 6 is an enlarged fragmentary sectional elevation through a wheel and axle assembly and the associated truck structure of the truck constructions illustrated in Figures 1 to 5 inclusive;

Figure 7 is a fragmentary sectional elevation of yet another modified form of truck mounting;

Figure 8 is a fragmentary transverse sectional elevation taken substantially in the vertical plane through the center line of the wheel and axle assembly of the truck construction shown in Figure 7;

Figure 9 is a fragmentary sectional elevation of yet another modified form of truck mounting;

Figure 10 is a fragmentary transverse sectional elevation taken substantially in the vertical plane through the center line of the wheel and axle assembly of the truck construction shown in Figure 9.

Referring first of all more particularly to the truck constructions illustrated in Figures 1 and 2, the truck side frame 20 of the inboard truck is substantially of truss construction, including the upper compression member 22 and the lower tension member 24, said members merging adjacent the ends thereof as at 26 and being provided at said ends with the seat portion 28 provided with the coil spring seat 30. The side frame is provided with spaced upwardly converging struts 32 and 34 formed integral with the tension and compression members, the inner struts 32 with horizontal portions of the tension and compression members forming the window 36 for the reception of the ends of the load carrying member, which, in the construction shown, is the bolster 38. The bolster 38 is provided with the usual center bearing 40 and side bearings 42, and serves to space and position the spaced side frames by means of the depending inner and outer lugs 44 and 46.

The side frame adjacent the merged portions 26 is provided with the depending pedestal jaws 48 adapted to accommodate the pedestal cooperating portions slidably received therein, said portions being defined and positioned by means of the spaced lugs or flanges 50 provided on the outer axle 52 of the wheel and axle assembly 54. The axle is provided with the stirrup 56 having spaced members 58 provided with the spring seat 60, said spring seat accommodating and positioning the spring band 62 of the semi-elliptic leaf spring assembly 64. The inner leg of the semi-elliptic leaf spring assembly is apertured for reception of the depending positioning dowel 66 of the spring seat 68, said seat being preferably located in substantial alignment with the strut 34. The outer end of the leaf spring assembly is apertured for reception of the depending dowel 70 of the coil spring seat 72. The coil spring 74 is interposed between said seat 72 and the seat 30 provided on the side frame, and is retained between said seats by means of the assembly bolt 76. The coil spring may be of constant pitch, variable pitch, variable section, variable stiffness, tapered section and constant or variable pitch, or any construction such as shown in application Serial No. 552,153, filed July 21, 1931.

In the construction shown in Figures 3 to 5 inclusive, the inboard type of truck is provided with the side frame 100 which is substantially of truss construction, being provided with the upper compression member 102 and the lower tension member 104, merging adjacent the ends thereof as at 106 and being provided with the depending seat portion 108 preferably forming a part of the outer of the depending pedestal jaws 110 adapted to have sliding cooperation with suitable surfaces on the outer axle 112 of the wheel and axle assembly 114 and defined by the lugs or flanges 116, the axle also being provided adjacent the pedestals with the stirrup 118 similar to stirrup 56.

The tension and compression members are integrally connected by means of the struts or columns 120 forming the window 122 therewith into which the end of the bolster 124 extends. The bolster is of conventional construction provided with the center bearing 126 and the side bearings 128 extending through said window and serving to position the spaced side frames by means of the inner and outer lugs 130 and 132. The upper chord 134 of the tension member adjacent the inner pedestal 110 is provided with a coil spring seat 136 for accommodating the coil spring 138. The coil spring is positioned between the seat 136 and the seat 140, the positioning bolt 142 passing through the respective seats. The seat 140 is provided with the depending dowel 144 adapted to be received in a suitable aperture formed in the inner leg of the semi-elliptic leaf spring assembly 146. The leaf spring is provided with the spring band 148 supported and positioned on the seat 150 provided on the stirrup 118, the outer leg of the leaf spring being suitably apertured for the reception of the positioning dowel 152 of the seat 154 provided on the bracket 108.

Referring now more particularly to the wheel and axle assembly illustrated in Figure 6, and which it is understood may be used in any of the truck constructions shown herein, said assembly consists essentially of the outer axle or casing 114 which is normally a stationary member, and an inner axle 156 extending through said outer axle and being provided with the hub portion 158 for the reception of the hub 160 of the housing 162. The housing 162 is provided with a wheel hub portion 164 for receiving the hub of the wheel 166, a suitable positioning shoulder 168 being provided on said portion 164 for limiting the inward position of the wheel. The cover plate 170 is secured to the housing 162 as by means of the bolts 172, and the cover plate and housing form a lubricant recess 174 with a bearing recess 176, the latter being adapted to receive the outer racering 178 of the anti-friction bearing assembly 180. The anti-friction bearing assembly consists essentially of the outer racering 178 and the course of rollers 182 spaced by means of the cage 184, the rollers having bearing engagement with the inner racering 186 mounted on the race receiving portion 188 of the outer axle 114.

The cover plate 170 extends inwardly and is channeled as at 190 for conducting lubricant to the bottom of the lubricant recess, the deflector plate 192 being mounted on the outer axle adjacent the inner racering overlying said channel. The outer axle is grooved or dished to accommodate the baffle ring 194 mounted on the outer axle for preventing the ingress of grit, dirt, etc. In order to conveniently introduce lubricant to the bearings, the fitting 196 is provided on the housing 162, the fitting communicating with the lubricant channel 198 whereby lubricant will be readily and easily introduced to the bearing and lubricant recess. As already described, the outer axle is provided with the stirrup 118 having the seat 150 for accommodating the spring band 148 of the semi-elliptic leaf spring assembly 146 which has resilient and non-resilient cooperation with the side frame. The outer axle is also provided with the spaced flanges 116 having sliding cooperation with the pedestals formed in the side frame.

With the construction shown in Figures 7 and 8, the stirrup 200 is separable from the tubular axle 202 of the wheel and axle assembly 204, said wheel and axle assembly being similar to that already described, and the side frame and spring arrangement being similar to that described with respect to Figures 3 and 4. The stirrup in this case is adapted to interlock as at 206 with means provided on the outer axle 202, the stirrup being provided with the spaced lugs 208 defining the surface having sliding cooperation with the pedestals 110.

In Figures 9 and 10, the stirrup 210 also is separate from the outer axle 202 and provided with the spaced flanges 212 defining surfaces having sliding cooperation with the pedestals 110. In this case the stirrup includes pairs of spaced straps 214 connected by means of the seats 216, the adjacent seats 216 being adapted to accommodate the spring seat member 218 adapted to span and engage said members 216. The seat 218 is adapted to accommodate the spring band 148 of the leaf spring assembly 146. The spring suspension of the side frame is similar to that described with respect to Figures 3 and 4.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

What is claimed is—

1. In an inboard car truck, the combination of spaced wheel and axle assemblies each having an inner and an outer axle and roller bearings therebetween, a side frame disposed inwardly of the wheels of said assemblies, said side frame having a tension and a compression member and spaced column members forming a window, a bolster supported on said tension member within said window, a leaf spring mounted on the outer axle of each of said wheel and axle assemblies for support of said side frame, one end of said leaf spring non-resiliently supporting said side frame, said roller bearings being offset outwardly in respect to said springs.

2. In an inboard car truck, the combination of spaced wheel and axle assemblies each having an inner and an outer axle and roller bearings therebetween, a side frame disposed inwardly of the wheels of said assemblies, said side frame having a tension and compression member and spaced column members forming a window, a bolster supported on said tension member within said window, a leaf spring mounted on the outer axle of each of said wheel and axle assemblies for support of said side frame, one end of said leaf spring resiliently supporting said side frame through a member of different character than said spring, said roller bearings being offset in respect to said springs.

3. In an inboard car truck, the combination of spaced wheel and axle assemblies each having an inner and an outer axle and roller bearings therebetween, a side frame disposed inwardly of the wheels of said assemblies, said side frame having a tension and compression member and spaced column guides, a bolster extending between said guides, a leaf spring mounted on the outer axle of each of said wheel and axle assemblies and in the plane of said side frame for support of said side frame, the inner end of said leaf springs non-resiliently supporting said side frame, and a coil spring interposed between the outer end of each of said springs and said side frame, said roller bearings being offset outwardly in respect to said springs.

4. In an inboard car truck, the combination of wheel and axle assemblies each having an inner and an outer axle and roller bearings therebetween, a side frame disposed inwardly of the wheels of said assemblies, a leaf spring carried by the outer axle of each of said wheel and axle assemblies and supporting said side frame through a non-resilient engagement at one point and through a resilient connection at another point, said roller bearings being offset outwardly in respect to said springs.

5. In a wheel and axle assembly having an inner and an outer axle, the combination of a spring mounting having spring receiving means supported by one of said axles, said means including a stirrup provided with spaced substantially horizontally disposed portions, a removable seat mounted on said portions, said portions and seat having engaging shoulders preventing displacement of said seat, and a leaf spring having a spring band mounted on said removable seat.

6. In a wheel and axle assembly having an inner and an outer axle, the combination of a spring mounting having spring receiving means supported by one of said axles and depending therefrom, said means including spaced supports having substantially horizontally disposed portions, a removable seat mounted on said portions, said portions and seat having shoulders in interlocking engagement to prevent displacement of said seat, and a leaf spring having a spring band mounted on said removable seat.

7. In a car truck, the combination of a side frame including tension and compression members merging adjacent the ends thereof and being provided with spaced pedestals adjacent said ends, spaced wheel and axle assemblies each having an inner and an outer axle and roller bearings therebetween, the outer axles thereof having sliding cooperation with said pedestals, a spring seat on the outer axle of each of said assemblies, spring seats on said side frame on each side of said pedestals, a leaf spring mounted on each of the seats on said axles for support of said side frame and resiliently mounted on the inner of said side frame seats, said roller bearings being offset outwardly in respect to said springs.

8. In a side frame, the combination of tension and compression members merging adjacent the ends thereof and provided with pedestals adapted to cooperate with wheel and axle assemblies, said tension and compression members being provided with pairs of spaced struts, the struts of each pair converging toward and merging at a point adjacent said compression member, one of said struts of each pair forming a load carrying member receiving window with said tension and compression members.

9. In a side frame, the combination of tension and compression members merging adjacent the ends thereof and provided with pedestals adapted to cooperate with wheel and axle assemblies, said tension and compression members being provided with pairs of spaced struts, the struts of each pair converging toward and merging at a point adjacent said compression member, one of said struts of each pair forming a load carrying member receiving window with said tension and compression members, and spring seats for springs of different character disposed on each side of said pedestals.

10. In a wheel and axle assembly, the combination of inner and outer axles, anti-friction bearings between said axles, a member on one of said axles being provided with pedestal cooperating portions and an integral stirrup therebetween, said stirrup including spaced substantially vertically disposed members interconnected by horizontally disposed members, a connecting leaf spring seat between said vertically disposed members and having shoulders interlocking with said spaced horizontally disposed members to prevent displacement, and a leaf spring mounted on said seat between said vertically disposed members.

11. In a wheel and axle assembly, the combination of inner and outer axles, anti-friction bearings between said axles, one of said axles being provided with a member engageable with said axle and having pedestal cooperating portions and a stirrup integral therewith, said stirrup including spaced substantially vertically disposed members, a connecting leaf spring seat therebetween, and a leaf spring mounted on said seat between said vertically disposed members.

12. In a car truck, the combination of a side frame including tension and compression members merging adjacent the ends thereof and being provided with spaced pedestals adjacent said ends, spaced wheel and axle assemblies each having an inner and an outer axle and roller bearings therebetween, the outer axles thereof having sliding cooperation with said pedestals, a spring seat on the outer axle of each of said assemblies, spring seats on said side frame on each side of said pedestals, a leaf spring mounted on each of the seats on said axles for support of said side frame, said spring being non-resiliently mounted on the inner of the side frame seats, and resiliently mounted on the other of said side frame seats, said roller bearings being offset outwardly in respect to said springs.

13. In a car truck, the combination of a side frame including tension and compression members merging adjacent the ends thereof and being provided with spaced pedestals adjacent said ends, spaced wheel and axle assemblies each having an inner and an outer axle and roller bearings therebetween, the outer axles thereof having sliding cooperation with said pedestals, a spring seat on the outer axle of each of said assemblies, spring seats on said side frame on each side of said pedestals, a leaf spring mounted on each of the seats on said axles for support of said side frame, said spring being non-resiliently mounted on one of the side frame seats and resiliently mounted on the other of said side frame seats, said resilient mounting including a coil spring of constant pitch and constant diameter, said roller bearings being offset outwardly in respect to said springs.

14. In a car truck, the combination of a side frame including tension and compression members merging adjacent the ends thereof and being provided with spaced pedestals adjacent said ends, spaced wheel and axle assemblies each having an inner and an outer axle and roller bearings therebetween, the outer axles thereof having sliding cooperation with said pedestals, a spring seat on the outer axle of each of said assemblies, spring seats on said side frame on each side of said pedestals, a leaf spring mounted on each of the seats on said axles for support of said side frame, said spring being non-resiliently mounted on one of the side frame seats and resiliently mounted on the other of said side frame seats, said resilient mounting including a coil spring, said roller bearings being offset outwardly in respect to said springs.

15. In a car truck, the combination of a side frame including tension and compression members merging adjacent the ends thereof and being provided with spaced pedestals adjacent said ends, spaced wheel and axle assemblies each having an inner and an outer axle and roller bearings therebetween, the outer axles thereof having sliding cooperation with said pedestals, a spring seat below and on the outer axle of each of said assemblies, spring seats on said side frame on each side of said pedestals, a leaf spring mounted on each of the seats on said axles for support of said side frame, said spring being non-resiliently mounted on one of the side frame seats and resiliently mounted on the other of said side frame seats, said resilient mounting including a coil spring, said roller bearings being offset outwardly in respect to said springs.

16. In a car truck, the combination of a side frame including tension and compression members merging adjacent the ends thereof and being provided with spaced pedestals adjacent said ends, spaced wheel and axle assemblies each having an inner and an outer axle and roller bearings therebetween, the outer axles thereof having sliding cooperation with said pedestals, a spring seat on each of said outer axles inwardly of the wheels, spring seats on said side frame on each side of said pedestals, a leaf spring mounted on each of the seats on said axles for support of said side frame, said spring being non-resiliently mounted on one of the side frame seats and resiliently mounted on the other of said side frame seats, said resilient mounting including a coil spring, said roller bearings being offset outwardly in respect to said springs.

17. In a car truck, the combination of a side frame including tension and compression members merging adjacent the ends thereof and being provided with spaced pedestals adjacent said ends, spaced wheel and axle assemblies each having an inner and an outer axle and roller bearings therebetween, the outer axles thereof having sliding cooperation with said pedestals, a spring seat below and on the outer axle of each of said assemblies inwardly of the wheels, spring seats on said side frame on each side of said pedestals, a leaf spring mounted on each of the seats on said axles for support of said side frame, said spring being non-resiliently mounted on one of the side frame seats and resiliently mounted on the other of said side frame seats, said resilient mounting including a coil spring, said roller bearings being offset outwardly in respect to said springs.

18. In a car truck, the combination of a side frame including tension and compression members merging adjacent the ends thereof and being provided with spaced pedestals adjacent said ends, spaced wheel and axle assemblies each having an inner and an outer axle and roller bearings therebetween, the outer axles thereof having sliding cooperation with said pedestals, a spring seat disposed in a stirrup on the outer axles of each of said assemblies, spring seats on said side frame on each side of said pedestals, a leaf spring mounted on each of the seats on said axles for support of said side frame, said spring being non-resiliently mounted on one of the side frame seats and resiliently mounted on the other of said side frame seats, said resilient mounting including a coil spring, said roller bearings being offset outwardly in respect to said springs.

19. In an inboard car truck, the combination of wheel and axle assemblies each having an inner and an outer axle and roller bearings therebetween, a side frame disposed inwardly of the wheels of said assemblies, said side frame having a tension member and a compression member and spaced column members forming a window, a bolster supported on said tension member within said window, and a leaf spring mounted on the outer axle of each of said wheel and axle assemblies for supporting said side frame, said roller bearings being offset outwardly in respect to said springs.

20. In a car truck, the combination of a side frame, a wheel and axle assembly having an inner and outer axle and roller bearings therebetween, a semi-elliptic leaf spring supported by said outer axle below the same for supporting said side frame, said spring supporting said side frame directly at one end, and a coil spring disposed between said side frame and the other end of said leaf spring, said roller bearings being offset outwardly in respect to said springs.

21. In a car truck, the combination of a side frame, a wheel and axle assembly having an inner and outer axle and roller bearings therebetween, means on said frame cooperatively engaging said assembly for guiding the same upon relative movement therebetween, a semi-elliptic leaf spring supported by said outer axle below the same for supporting said side frame, and a coil spring between an end of said leaf spring and said side frame, said roller bearings being offset outwardly in respect to said springs.

22. In a car truck, the combination of a side frame, a wheel and axle assembly having an inner and outer axle and roller bearings therebetween, a semi-elliptic leaf spring supported by said outer axle below the same for supporting said side frame, said spring engaging said frame at one end, and a coil spring between the other end of said leaf spring and said side frame, said roller bearings being offset outwardly in respect to said springs.

23. In a car truck, the combination of a side frame, a wheel and axle assembly having an inner and outer axle and roller bearings therebetween, a semi-elliptic leaf spring supported by said outer axle below the same for supporting said side frame, said spring engaging said frame at the inner end, and a coil spring between the outer end of said leaf spring and said side frame, said roller bearings being offset outwardly in respect to said springs.

24. In a car truck, the combination of a side frame, a wheel and axle assembly having an inner and outer axle and roller bearings therebetween, means on said frame cooperatively engaging said assembly for guiding the same upon relative movement therebetween, a semi-elliptic leaf spring supported by said outer axle below the same for supporting said side frame, and a coil spring between the outer end of said leaf spring and said side frame, said roller bearings being offset outwardly in respect to said springs.

25. In a car truck, the combination of a side frame, a wheel and axle assembly having an inner and outer axle and roller bearings therebetween, a semi-elliptic leaf spring supported by said outer axle below the same for supporting said side frame, the inner end of said spring having non-resilient seating relation with said side frame, and a coil spring between the outer end of said leaf spring and said frame, said roller bearings being offset outwardly in respect to said springs.

26. In a car truck, the combination of a side frame, a wheel and axle assembly having an inner and outer axle and roller bearings therebetween, means on said frame and assembly for guiding the same upon relative movement therebetween, a leaf spring supported by said outer axle below the same for supporting said side frame, the inner end of said spring having non-resilient seating relation with said side frame, and a coil spring between the outer end of said leaf spring and said frame, said roller bearing being offset outwardly in respect to said springs.

27. In a car truck, the combination of a side frame, a wheel and axle assembly having an inner and outer axle and roller bearings therebetween, a semi-elliptic leaf spring supported by said outer axle below the same for supporting said side frame, the inner end of said spring having seating relation with said side frame, and a coil spring between the outer end of said leaf spring and said frame, said roller bearings being offset outwardly in respect to said springs.

28. In a car truck, the combination of a side frame, a wheel and axle assembly having an inner and outer axle and roller bearings therebetween, means on said frame and assembly for guiding the same upon relative movement therebetween, a leaf spring supported by said outer axle below the same for supporting said side frame, the inner end of said spring having seating relation with said side frame, and a coil spring between the outer end of said leaf spring and said frame, said roller bearings being offset outwardly in respect to said springs.

29. In a car truck, the combination of a side frame, a wheel and axle assembly having an inner and outer axle and roller bearings therebetween, a semi-elliptic leaf spring supported by said outer axle below the same for supporting said side frame, the outer end of said spring having non-resilient seating relation with said side frame, and a coil spring between the inner end of said leaf spring and said frame, said roller bearings being offset outwardly in respect to said springs.

30. In a car truck, the combination of a side frame, a wheel and axle assembly having an inner and outer axle and roller bearings therebetween, means on said frame and assembly for guiding the same upon relative movement therebetween, a leaf spring supported by said outer axle below the same for supporting said side frame, the outer end of said spring having non-resilient seating relation with said side frame, and a coil spring between the inner end of said leaf spring and said frame, said roller bearings being offset outwardly in respect to said springs.

31. In a wheel and axle assembly, the combination of an axle, and a spring mounting, said spring mounting comprising spaced members integral with said axle and depending therefrom, a connecting spring seat, and a leaf spring disposed between said members having a spring band disposed on said seat.

32. In a wheel and axle assembly, the combination of an axle, and a spring mounting, said spring mounting comprising spaced members integral with said axle and depending therefrom, a connecting spring seat, pedestal cooperating portions integral with said axle, and a leaf spring disposed between said members having a spring band disposed on said seat.

33. In a side frame, the combination of tension and compression members merging to form a single member at each end thereof provided with portions adapted to cooperate with wheel and axle assemblies, and spring seats of different character disposed on each side of said portions, one of said seats adjacent each of said assemblies being disposed above and the other of said seats being disposed below the level of said axles.

34. In a side frame, the combination of a member of truss formation comprising tension and compression members, and pairs of spaced struts, the struts of each pair converging toward and merging at a point adjacent said compression member, one of said struts of each pair forming a load carrying member receiving window with said tension and compression members.

35. In a side frame, the combination of a member of truss construction comprising tension and compression members merging adjacent the ends thereof and provided with pedestals adapted to cooperate with wheel and axle assemblies, said side frame having spring seats disposed on each side of said pedestals and in spaced relation with respect to the wheel and axle assembly cooperating portions of said side frame, one of said seats adjacent each of said assemblies being disposed above and the other of said seats being disposed below the level of said axles.

36. In a side frame, the combination of a member of truss construction comprising tension and compression members merging adjacent the ends thereof and provided with pedestals adapted to cooperate with wheel and axle assemblies, said side frame having spring seats of different character disposed on each side of said pedestals, one of said seats adjacent each of said assemblies being disposed above and the other of said seats being disposed below the level of said axles.

37. In a side frame, the combination of a member of truss construction comprising tension and compression members merging adjacent the ends thereof and provided with pedestals adapted to cooperate with wheel and axle assemblies, spaced struts between said members forming a load carrying member receiving window with said tension and compression members, said side frame having spring seats disposed on each side of said pedestals and in spaced relation with respect to the wheel and axle assembly cooperating portions of said frame, one of said seats adjacent each of said assemblies being disposed above and the other of said seats being disposed below the level of said axles.

38. In a side frame, the combination of tension and compression members merging to form a single member at each end thereof provided with portions adapted to cooperate with wheel and axle assemblies, pairs of spaced struts extending from said tension member, the struts of each pair converging toward and merging at a point adjacent said compression member, and spring seats of different character disposed on each side of said portions, the inner of said spring seats being disposed adjacent one of the struts of each pair thereof.

39. In a side frame, the combination of tension and compression members merging to form a single member at each end thereof provided with portions adapted to cooperate with wheel and axle assemblies, pairs of spaced struts extending from said tension member, the struts of each pair converging toward and merging at a point adjacent said compression member, coil spring seats disposed outwardly of and leaf spring seats disposed inwardly of said portions, said leaf spring seats being disposed adjacent one of the struts of each pair thereof.

40. In a side frame, the combination of tension and compression members merging to form a single member at each end thereof provided with portions adapted to cooperate with wheel and axle assemblies, seat portions extending outwardly from said first-named portions, said tension member having an upper chord, and spring seats at each end of said side frame of different character disposed on a seat portion and said upper chord.

41. In a side frame, the combination of tension and compression members merging to form a single member at each end thereof provided with portions adapted to cooperate with wheel and axle assemblies, seat portions extending outwardly from said first-named portions, said tension member having an upper chord, a leaf spring seat disposed on each of said seat portions outwardly of said first-named portions, and a coil spring seat on said upper chord inwardly of each of said first-named portions.

42. In a car truck, the combination of a side frame including tension and compression members merging adjacent the ends thereof to form portions cooperating with wheel and axle assemblies, said tension and compression members being provided with pairs of spaced struts, the struts of each pair converging toward and merging at a point adjacent said compression member, one of said struts of each pair forming a load carrying member receiving window with said tension and compression members, wheel and axle assemblies disposed to cooperate with said portions, said assemblies each having a seated stirrup, a leaf spring mounted on the seat of each of said stirrups and having one end disposed in supporting relation to said side frame, said spring having another end supporting said side frame through a coil spring.

43. In a car truck, the combination of a side frame including tension and compression members merging adjacent the ends thereof to form portions cooperating with wheel and axle assemblies, said tension and compression members being provided with pairs of spaced struts, the struts of each pair converging toward and merging at a point adjacent said compression member, one of said struts of each pair forming a load carrying member receiving window with said tension and compression members, wheel and axle assemblies disposed to cooperate with said portions, said assemblies each having a seated stirrup, a leaf spring mounted on the seat of each of said stirrups and having one end disposed in supporting relation to said side frame adjacent one of said struts, said spring having another end supporting said side frame through a coil spring.

44. In a car truck, the combination of a side frame including tension and compression members merging adjacent the ends thereof to form portions cooperating with wheel and axle assemblies, said tension and compression members being provided with pairs of spaced struts, the struts of each pair converging toward and merging at a point adjacent said compression member, one of said struts of each pair forming a load carrying member receiving window with said tension and compression members, wheel and axle assemblies disposed to cooperate with said portions, said assemblies each having a seated stirrup, a leaf spring mounted on the seat of each of said stirrups and having its inner end disposed in supporting relation to said side frame adjacent one of said struts, the outer end of said spring supporting said side frame through a coil spring.

45. In a car truck, the combination of a side frame including tension and compression members merging adjacent the ends thereof to form portions cooperating with wheel and axle assemblies, wheel and axle assemblies each having an inner and an outer axle and roller bearings therebetween, the outer axle of said assemblies being disposed to cooperate with said portions, said assemblies each having a seated stirrup, a leaf spring mounted on the seat of each of said stirrups and having the outer end thereof disposed in supporting relation to said side frame, said spring having its inner end supporting said side frame through a coil spring, said roller bearings being offset outwardly in respect to said springs.

46. In a car truck, the combination of a side frame including tension and compression members merging adjacent the ends thereof to form portions cooperating with wheel and axle assemblies, said tension member including an upper chord; wheel and axle assemblies disposed to cooperate with said portions, said assemblies each having a seated stirrup, a leaf spring mounted on the seat of each of said stirrups and having the outer end thereof disposed in supporting relation to said side frame, said spring having its inner end supporting said side frame through a coil spring having seating relation with said upper chord.

47. In a car truck, the combination of a side frame including tension and compression members merging adjacent the ends thereof to form single portions having depending pedestal jaws adapted to cooperate with wheel and axle assemblies, said portions each having a depending seat forming a part of the outer of said pedestal jaws, wheel and axle assemblies each having an inner and an outer axle and roller bearings therebetween, the outer axle of said assemblies being disposed to cooperate with said pedestal jaws, said assemblies each having a seated stirrup, a leaf spring mounted on the seat of each of said stirrups and having the outer end thereof disposed in supporting relation to said side frame through cooperative relation with one of said seats, said spring having its inner end supporting said side frame through a coil spring; said roller bearings being offset outwardly in respect to said springs.

48. In a car truck, the combination of a side frame including tension and compression members merging adjacent the ends thereof to form single portions having depending pedestal jaws adapted to cooperate with wheel and axle assemblies, said portions each having a depending seat forming a part of the outer of said pedestal jaws, said tension member including an upper chord, wheel and axle assemblies disposed to cooperate with said pedestal jaws, said assemblies each having a seated stirrup, a leaf spring mounted on the seat of each of said stirrups and having the outer end thereof disposed in supporting relation to said side frame through cooperative relation with one of said seats, said spring having its inner end supporting said side frame through a coil spring having seating relation with said upper chord.

WILLIAM C. HEDGCOCK.

CERTIFICATE OF CORRECTION.

Patent No. 2,064,471.   December 15, 1936.

WILLIAM C. HEDGCOCK.

It is hereby certified that error appears in the printed specification of the above numbered patent requiring correction as follows: Page 3, first column, line 67, claim 2, after the word "offset" insert outwardly; page 4, second column, line 22, claim 15, before "frame" insert side; and that the said Letters Patent should be read with these corrections therein that the same may conform to the record of the case in the Patent Office.

Signed and sealed this 16th day of March, A. D. 1937.

Henry Van Arsdale
Acting Commissioner of Patents.

(Seal)